June 13, 1950     A. J. TURPIN     2,511,754

PIPE JOINT

Filed April 4, 1946

INVENTOR
ALEXANDER J. TURPIN
BY
*Fred'L Schuster*
ATTORNEY

Patented June 13, 1950

2,511,754

UNITED STATES PATENT OFFICE 2,511,754

PIPE JOINT

Alexander J. Turpin, Stewart Manor, N. Y., assignor to Hauck Manufacturing Company, Brooklyn, N. Y., a corporation of New York Application April 4, 1946, Serial No. 659,607

3 Claims. (Cl. 285—49)

The invention relates to a novel means for attaching to the top of a pressure tank a, generally, manually operable pump for establishing within the said tank fluid pressure. In thus securing the pumping mechanism to the top of the tank it has been the practice to weld about the edge of the tank opening, through which a portion of the pumping mechanism is to be introduced, a ring which is thereby sealed to provide a pressure tight joint. The said ring, moreover, is internally threaded to receive and retain a bushing element to which has been soldered or otherwise secured the cylindrical barrel of the pump, so that by threading the bushing element into the ring the pump is located in position as well as being sealed to the tank against loss of pressure therein. Or, provision has been made for a lap-joint connection at the tank top opening between an extended neck portion thereof and a bushing holding member.

Certain objections are inherent in these connections, for example, in the case of the welded ring, the latter must be thoroughly welded throughout its circumference, which involves the expenditure of time and material, as well as requiring the service of a skilled welder. The necessarily high welding temperature involved heats excessively the top of the tank so that its outer surface oxidizes and scales, thus affecting the finish thereof, or the durability of a coating subsequently to be applied. In the lap-joint type, a specially formed outlet of the tank top is required.

It is an object of the present invention to provide a connection which does not require that the securing ring be sealed to the tank top but merely securely attached thereto as at a number of points, for example, by spot welding it to the outer surface of the top.

A further object of the invention is to provide a joint assembly which will require no modification in the surface of the tank top, nor will any marring thereof result from the attachment.

In carrying out the invention, there is provided coaxially about the customary opening in the top of a pressure tank an annular member of substantially greater opening diameter than the diameter of the said tank opening, said annular member being attached to the outer surface of the top at a sufficient number of points to insure proper holding. This may conveniently be effected by spot welding one portion of an angular shaped ring member to said surface, the other portion projecting then upwardly from the tank top and is internally threaded to receive a bushing member of the pump mechanism. The bushing member is, preferably, of reduced diameter at its inner end to afford a shoulder located over the exposed area of the tank top between the top opening and the annular securing member attached to said top; and between said area and the shoulder is inserted a suitable gasket so that a tight seal may be secured by exerting pressure upon said gasket by threading inwardly the said bushing member.

Provision is made for securing to the inner end of the bushing member, which is caused to project into the tank, the barrel or cylinder of the pump mechanism, such means comprising, for example, a sleeve or extension outwardly therefrom and which is interlocked with the reduced end of the bushing member. It may, also, be additionally secured as by being provided with an outwardly directed flange which is designed to fit between the gasket and the shoulder of the bushing member.

The nature of the invention, however, will best be understood when described in connection with the accompanying drawings, in which.

Figure 1:
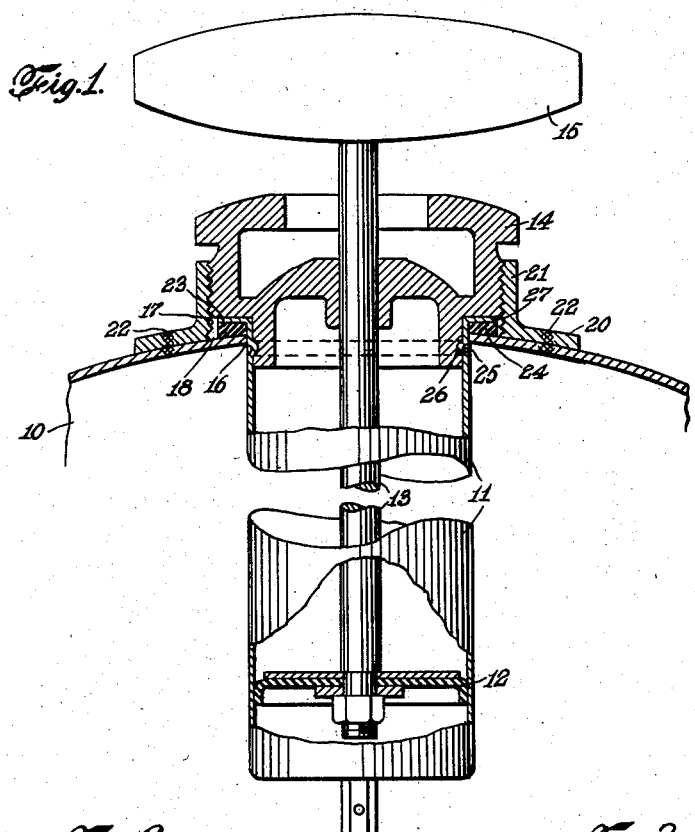
Fig. 1 is a fragmentary vertical section of a pressure tank illustrating the attachment of a pump thereto by the novel means.
Figure 2:
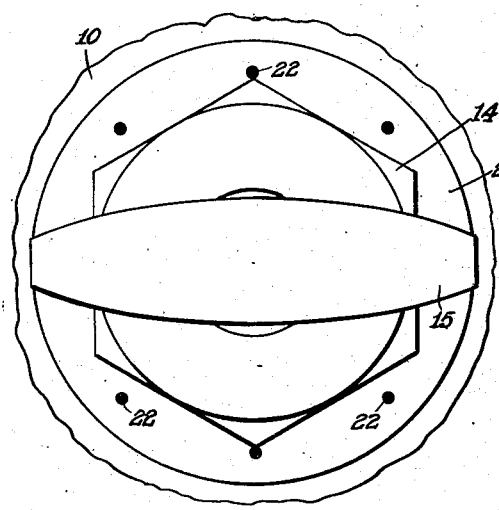
Fig. 2 is a plan view thereof.
Figure 3:
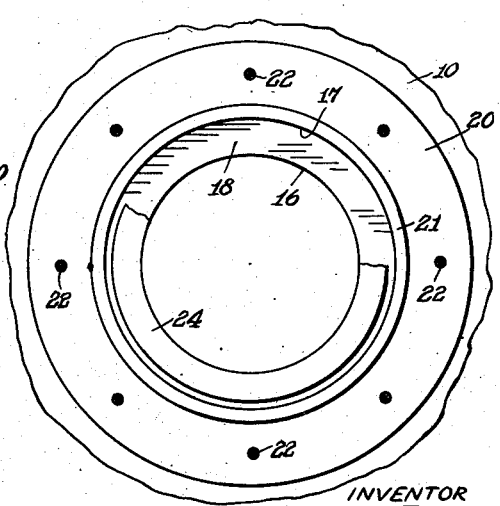
Fig. 3 is a similar view but with the pump removed.

Referring to the drawings, 10 designates a tank for retaining liquid fuel or other liquid (not shown), a sufficiently high pressure being designed to be provided within the tank to expel the liquid for use. This pressure may be established by means of the air pump indicated by its cylinder 11 and piston 12, also a piston rod 13 extending through a head or bushing member 14 and adapted for manipulation by a handle 15 secured to the outer end of the piston rod 13—all of which is well understood and for which no claim is made herein.

However, a novel means for mounting said cylinder on the top of the tank is disclosed whereby it will be sealed to said top in a simple and effective manner so that no leakage may occur though the pump may be readily installed in the tank and removed therefrom when this becomes necessary.

To this end, there is secured about the opening 16 in the tank top and through which the pump is to be introduced, an annular member having an opening 17 of a diameter appreciably greater than that of the opening 16 in the top of the said tank so as to leave an exposed area 18 of the outer surface of the top about opening 16. The annular member is, preferably, of angular conformation having the horizontal portion 20 adapted for attachment to the top surface and a portion 21 substantially at right angles thereto and extending then upwardly from the top surface and affording a tubular internally threaded portion which is adapted to receive the externally threaded head or bushing member 14 of the pump. Said annular member through its portion 20 is secured at a number of points, as indicated at 22, to the top surface of the tank, for example, by spot welding the same, no attempt, however, being made to secure a gas-tight seal between the portion 20 and the said top surface.

The bushing member is, preferably, of reduced diameter at its inner end affording a shoulder 23 which is adapted to bear upon an annular gasket 24 seated on the exposed surface area 18 about the said reduced inner end. By then screwing in said bushing member, a tight seal is secured between the pump and the tank to prevent loss of pressure through the connection of the former to the latter.

The bushing member 14 is, preferably, constructed as separate from the pump cylinder 11 which may be extended outwardly as indicated at 25, slipped over the reduced end of member 14 and then crimped at a number of points into a circular groove 26 provided in the periphery of said reduced end of member 14. The extended portion may also be provided with an outwardly directed flange 27 designed to fit over the gasket 24 to hold additionally the said cylinder and bushing member together.

I claim:

1. Means for sealing a pump to a sheet metal pressure tank provided with an opening in its top, said pump having a cylinder adapted to pass through said opening into the pressure tank, the sealing means comprising an annular member of uniform internal diameter greater than the diameter of the top opening, said member having an outwardly-directed flange permanently attached to the top surface of the tank to afford a non-pressure-tight joint therewith coaxial with the opening therein and exposing an annular area of the top about and adjacent said opening, said annular member having also an internally threaded portion upstanding therefrom coaxial with said opening; a bushing member externally threaded to fit the threaded portion of the annular member; and a gasket located between the bushing member and the said top surface area enclosed by the annular member.

2. The sealing means of claim 1, wherein the bushing member is of reduced diameter at its inner end to afford a shoulder for exerting pressure upon the gasket when said bushing member is threaded into the said annular member.

3. The sealing means of claim 1, wherein the bushing member is of reduced diameter at its inner end to afford a shoulder for exerting pressure upon the gasket when said bushing member is threaded into the said annular member, and the cylinder of the pump is extended at its outer end to fit over the reduced end of the bushing member and is provided with an outwardly turned flange to fit between the gasket and the shoulder of the bushing member.

ALEXANDER J. TURPIN.

REFERENCES CITED

The following references are of record in the file of this patent:

UNITED STATES PATENTS

| Number | Name | Date |
|---|---|---|
| 930,845 | Dawes | Aug. 10, 1909 |
| 1,398,985 | Wadley | Dec. 6, 1921 |
| 1,402,552 | Wackwitz | Jan. 3, 1922 |